(12) United States Patent
Billig et al.

(10) Patent No.: US 9,577,839 B2
(45) Date of Patent: Feb. 21, 2017

(54) LOCATION-BASED ADDRESSING LIGHTING AND ENVIRONMENTAL CONTROL SYSTEM, DEVICE AND METHOD

(71) Applicant: The Watt Stopper, Inc., Carlsbad, CA (US)

(72) Inventors: Richard R. Billig, Los Gatos, CA (US); Alexandre Debernard, Oceanside, CA (US); Bertrand Debever, Carlsbad, CA (US)

(73) Assignee: The Watt Stopper, Inc., Carlsbad, CA (US)

( * ) Notice: Subject to any disclaimer, the term of this patent is extended or adjusted under 35 U.S.C. 154(b) by 254 days.

(21) Appl. No.: 14/452,278

(22) Filed: Aug. 5, 2014

(65) Prior Publication Data

US 2015/0028998 A1    Jan. 29, 2015

Related U.S. Application Data

(63) Continuation of application No. 12/927,716, filed on Nov. 23, 2010, now Pat. No. 8,796,958, which is a
(Continued)

(51) Int. Cl.
*H04L 12/28* (2006.01)
*H04L 29/12* (2006.01)
(Continued)

(52) U.S. Cl.
CPC ........ *H04L 12/2818* (2013.01); *G08B 15/002* (2013.01); *H04L 29/12254* (2013.01);
(Continued)

(58) Field of Classification Search
CPC .......... H05B 37/0272; H04L 2012/285; H04L 29/12254; H04L 12/2818; H04L 61/2038; H04L 61/609
See application file for complete search history.

(56) References Cited

U.S. PATENT DOCUMENTS 5,726,644 A * 3/1998 Jednacz ................ H04L 1/1867
315/294
7,889,051 B1 * 2/2011 Billig .................. H04L 12/2818
340/286.01

* cited by examiner

*Primary Examiner* — Douglas W Owens
*Assistant Examiner* — Jonathan Cooper
(74) *Attorney, Agent, or Firm* — K. David Crockett, Esq.; Paul J. Backofen, Esq.; Crockett & Crockett, PC

(57) ABSTRACT

Location-Based Addressing (LBA) is a method of controlling and commissioning networked lighting devices. The lighting devices communicate over a wireless network using radio frequency communication protocols. The lighting devices are commissioned or grouped based on their 5 respective locations in a building floor plan or a building architecture. The lighting devices are commissioned to respond to radio frequency communications that correspond to their respective locations. This imposed location-based architecture reduces the amount of transmitted data required to control the lighting devices and, thus, reduces the radio bandwidth required to control the lighting devices. In other words, controlling devices "multicast" instructions and controlled devices "listen" for instructions and act only upon instructions that correspond to their respective location. Hand shaking or two-way communication between the controlling devices and the controlled devices is not required.

2 Claims, 13 Drawing Sheets

Related U.S. Application Data continuation of application No. 10/934,222, filed on Sep. 3, 2004, now Pat. No. 7,889,051.

(60) Provisional application No. 60/500,640, filed on Sep. 5, 2003.

(51) Int. Cl.
*H05B 37/02* (2006.01)
*G08B 15/00* (2006.01)

(52) U.S. Cl.
CPC ........ *H04L 61/2038* (2013.01); *H04L 61/609* (2013.01); *H05B 37/0272* (2013.01); *H04L 2012/285* (2013.01)

[<Address Information> <Control Information>]
　　　　405　　　　　　　　　410

*Fig. 6*

(<Building> <House> <Room> <Area in Room> <Device>)
　　425　　　430　　435　　　440　　　　445

<"North Tower","Taylor House","Living Room","Fireplace","Mantelpiece Lamp">
　　425"　　　　430"　　　　435"　　　　440"　　　　　445"

(< Building> <Floor> <Room> <Area in Room> <Device>)
　　525　　　530　　535　　　540　　　　545

*Fig. 8*

|     |     |     |     |     |     |
| --- | --- | --- | --- | --- | --- |
| 751 → | 6 | 15 | 3 | 5 | 1 | · · ·
| 752 → | 6 | 15 | 3 | 5 | 4 | · · ·
| 753 → | 6 | 15 | 3 | 7 | 2 | · · ·

| | 1115 | 1125 Destination Address | 1135 Source Address |
|---|---|---|---|
| 1110 → | Broadcast | — | LBA |
| 1120 → | Anonymous Multicast | LBA | — |
| 1130 → | Unicast | MAC | MAC |
| 1140 → | Multicast | LBA | MAC |

Table 1

*Fig. 15*

LOCATION-BASED ADDRESSING LIGHTING AND ENVIRONMENTAL CONTROL SYSTEM, DEVICE AND METHOD

RELATED APPLICATIONS

This Application is a Continuation Application of U.S. patent application Ser. No. 12/927,716 filed Nov. 23, 2011, now U.S. Pat. No. 8,796,958 which claims priority from U.S. patent application Ser. No. 10/934,222, filed Sep. 3, 2004, now U.S. Pat. No. 7,889,051 which claims priority under 35 U.S.C. §119(e) from the U.S. provisional patent application Ser. No. 60/500,640, filed on Sep. 5, 2003. The U.S. patent application Ser. No. 10/934,222 filed Sep. 3, 2004 and titled "LOCATION-BASED ADDRESSING and the provisional patent application Ser. No. 60/500,640, filed on Sep. 5, 2003, and titled "LOCATION-BASED ADDRESSING LIGHTING AND ENVIRONMENTAL CONTROL SYSTEM, DEVICE AND METHOD" are both hereby incorporated by reference.

FIELD OF THE INVENTIONS

The inventions described below relate the field of lighting and environmental control systems, devices and methods. More particularly, this invention relates to systems, devices, and methods that use addressing to control lighting and environmental control systems.

BACKGROUND OF THE INVENTIONS

Residential home owners often wish to remotely control electrical components in their homes. A home owner may, for example, wish to control the electrical components from a control device at a single, central location. Using one prior art system, the home owner can press one sequence of buttons on the control device to turn on one remote light, or he can press a second sequence of buttons on the control device to turn on another remote light. Using this system, the control device first learns or is programmed with a unique address for each remote light. The system is then able to individually address each remote light to thereby control it, such as by sending it a command to turn on or off. The system can also be used to commission multiple lights into a set so that each light in the set is identified by the same set address. In this way, all the lights in the set can be addressed and thereby controlled by transmitting a single command to the set. This latter address is generally referred to as a multicast address.

This and other prior art systems have several drawbacks. First, when commissioning lights or other electronic devices into a set, the control device must learn or be programmed to contain the unique address of an individual light or other electronic device. Second, these systems do not scale well. When individually controlling multiple devices in a room, the control device must send commands to each device, a time-consuming process. Third, these systems are difficult to maintain. When a device is replaced, all control devices used to control it must learn the address of the replacement device. For these reasons, it is also difficult to automate or customize a system to control these devices.

SUMMARY

The present invention is directed to a method of and a system for commissioning and controlling electronic devices using location-based addresses instead of device or logical addresses. Devices are preferably light fixtures, light switches, power outlets and combinations thereof. However, it will be clear to one skilled in the art that the device can be any number of electronic devices or appliances, including, but not limited to, heating units and air-conditioning units.

In accordance with the present invention, devices are commissioned into a set that preferably corresponds to a physical location, such as determined by a floor plan for a home, corporate building, or other structured physical environment. Electronic devices that are commissioned in accordance with the method of the present invention operate and inter-operate by messages directed to spatial locations rather than individual device addresses and thus require less bandwidth to implement the controls in contrast to two-way or "handshaking" methods of messaging typically used to communicate between devices.

In accordance with the present invention, a first device transmits control signals used to control the devices having corresponding location descriptors (LDs) using anonymous multicast signals. LDs designate the physical locations where the devices are commissioned. Each control signal contains a location-based address (LBA) that selects a set or group of electronic devices (target devices) and a function code corresponding to a specific function to be performed by the target devices. LBAs are address codes contained in a message or signal that selected the corresponding to target devices.

A function code, for example, can instruct each target device to turn on or off or to adjust its settings. Because one control signal can control multiple devices, fewer control signals are needed to control these devices, reducing both the bandwidth used and the complexity of devices to be controlled.

As used herein, when an electronic device transmits a control signal to control devices in a set, it is referred to as a transmitting device; when an electronic device receives a control signal and performs a function corresponding to a function code contained in the control signal, it is referred to as a receiving device. Preferably, each electronic device is able to function as both a transmitting device and a receiving device, also referred to as a "controlling device" and a "controlled device," respectively.

The system in accordance with the present invention efficiently controls devices using various means. For example, a transmitting device in the system transmits control signals as anonymous multicast signals, which do not use any handshaking protocols. The use of anonymous multicast signals reduces the number of control signals transmitted in accordance with the present invention, thus reducing traffic. Each receiving device is also programmed with a number of programmed functions. Each programmed function can be performed on the receiving device when the device is initially commissioned into a set, when the device receives a control signal containing a function code associated with the programmed function, or when an execution criterion is met, such as the occurrence of a programmed time. Thus, for example, by executing a programmed function on lighting units contained in a set, all of the lights in the set can be dimmed to a specific level. at a specific time. As a fail-safe measure, the transmitting device can assure that the receiving devices receive the control signal by repeatedly transmitting the control signal multiple times within a given time window.

By organizing the LBAs in a hierarchical manner, devices can be more conveniently controlled. Sets corresponding to an LBA can, however, be configured in any number of ways. In one embodiment, a set contains a first set of devices located at a first location (such as a first area of a room) and a second set of devices located at a second location (such as a second area of a room). The first and second sets or groups of devices can be commissioned so that they have LDs that are selectable or operable using a single LBA. Thus, these devices are addressable and can thus be controlled using a single control signal addressed with a single LBA. Sets can thus be configured and thus controlled in any number of ways to fit the application at hand.

In accordance with the present invention, a system for controlling a device using location-based addresses comprises a first device and a second device. The first device is configured to transmit control signals containing LBAs and function codes. The second device is commissioned to have a one or more LDs. That is, the second device has stored in memory one or more LDs that correspond to one or more sets of devices to which the second device has been commissioned into. The second device is said to be bound to the one or more set corresponding to the one or more LDs, a concept referred to as address binding. The second device is further configured to receive the control signals and to automatically execute functions corresponding to the function codes in response to a match of the LBAs and the one or more LDs. It is understood from the description below, that a match between an LBA of a control signal and an LD of a device does not require that the LBA and the LD have the same value. For example, the LBA can include a data field with a "wild card" code, in which case multiple LDs provide a match and all receiving devices with matching LDs will execute the corresponding function codes.

It will also be appreciated that the first device can be commissioned with one or more LDs that are the same or different from the one or more LDs of the second device and can be configured to receive control signals. Thus the first device can be a controlled device and a controlling device. In fact a number of devices in a system are preferably configured to and can be both controlled and controlling devices. However it is understood that a number of devices in the system can be dedicated controller devices or dedicated controlling devices.

Preferably, the LBAs have a hierarchical structure represented a data structure. The data structure has a first field corresponding to a building, a second field corresponding to one of a house within the building or a floor within the building, a third field corresponding to a room on one of the house and the floor, a fourth field corresponding to an area within the room, and a fifth field corresponding to one of a device type or a set of devices within the area.

Devices in the system of the present invention preferably transmit and receive control signals over a wireless medium. Accordingly, devices preferably include transceivers that are for transmitting and receiving radio control signals or infrared control signals. Where the transceivers are radio transceivers, the devices preferably transmit and receive control signals using frequencies between 902 MHz and 928 MHz. Alternatively, devices transmit and receive control signals over hard-wired media including, but not limited to, Ethernet cabling, power lines in a power-line network, fiber optic cables, or any combination of these.

Preferably, control signals are anonymous multicast signals. Alternatively, the control signals are multicast signals, broadcast control signals, or any other kind of transmitted control signals, depending on the application at hand. It will be appreciated that devices can be configured to transmit different types of control signals. Devices can transmit and receive multicast signals or unicast signals when a direct response to a transmitted control signal is appropriate, or based on the time of day or other suitable criteria. For example, during the day (a high traffic period), the devices can communicate using anonymous multicast signals. Later, when the traffic is lower, such as at night, on weekends, or on holidays, the system can switch to use multicast or other control signals.

In another embodiment, the system includes a device that is configured to receive and store location-based addresses and function codes corresponding to a sequence of previously transmitted control signals. The device is also configured to generate and transmit a sister set of control signals that correspond to the sequence of transmitted control signals. Such a device is referred to herein as a "playback" device. The playback device is particularly useful for operating lights and appliances when a residence is unoccupied and thus provides the appearance that the residence is occupied. The sister set of control signals do not necessarily provide a one-to-one correspondence to the sequence of previously transmitted control signals and selective playback of any portion of the sequence of previously transmitted control signals by the playback device is considered to be within the scope of the invention.

In accordance with the method of the present invention, a device commissioned with one or more LDs is controlled by transmitting control signals containing LBAs and function codes, receiving the control signals at the device and automatically executing functions corresponding to the function codes when the one or more LDs and the location based address match. Preferably, the device is one of a plurality of devices commissioned to the set having a common LD wherein each device is configured to receive the control signal and, in response, execute the function.

In yet further embodiments of the invention, the function comprises transmitting status about each device that can be received and stored to compile a history about a system. This history can be used for maintenance, security, the development of new protocols or any other purpose.

BRIEF DESCRIPTION OF THE DRAWINGS

FIG. 6 is a diagram of a template for a data structure containing hierarchical address information and control information included in a control signal in accordance with the present invention.

FIG. 7A is a first diagram of a template for the address information shown in FIG. 6.

FIG. 7B is a diagram of a completed data structure for the template shown in FIG. 7A using numbered components.

FIG. 7C is a diagram for a completed data structure for the template shown in FIG. 7B using text components.

FIG. 8 is a second diagram of a template for the address information shown in FIG. 6.

FIG. 11 is a diagram of a memory in a receiving device containing multiple location-based addresses in accordance with the present invention.

FIG. 15 shows a table illustrating types of signals and the source and destination address contained in each signal.

DETAILED DESCRIPTION OF THE INVENTIONS

Figure 1:
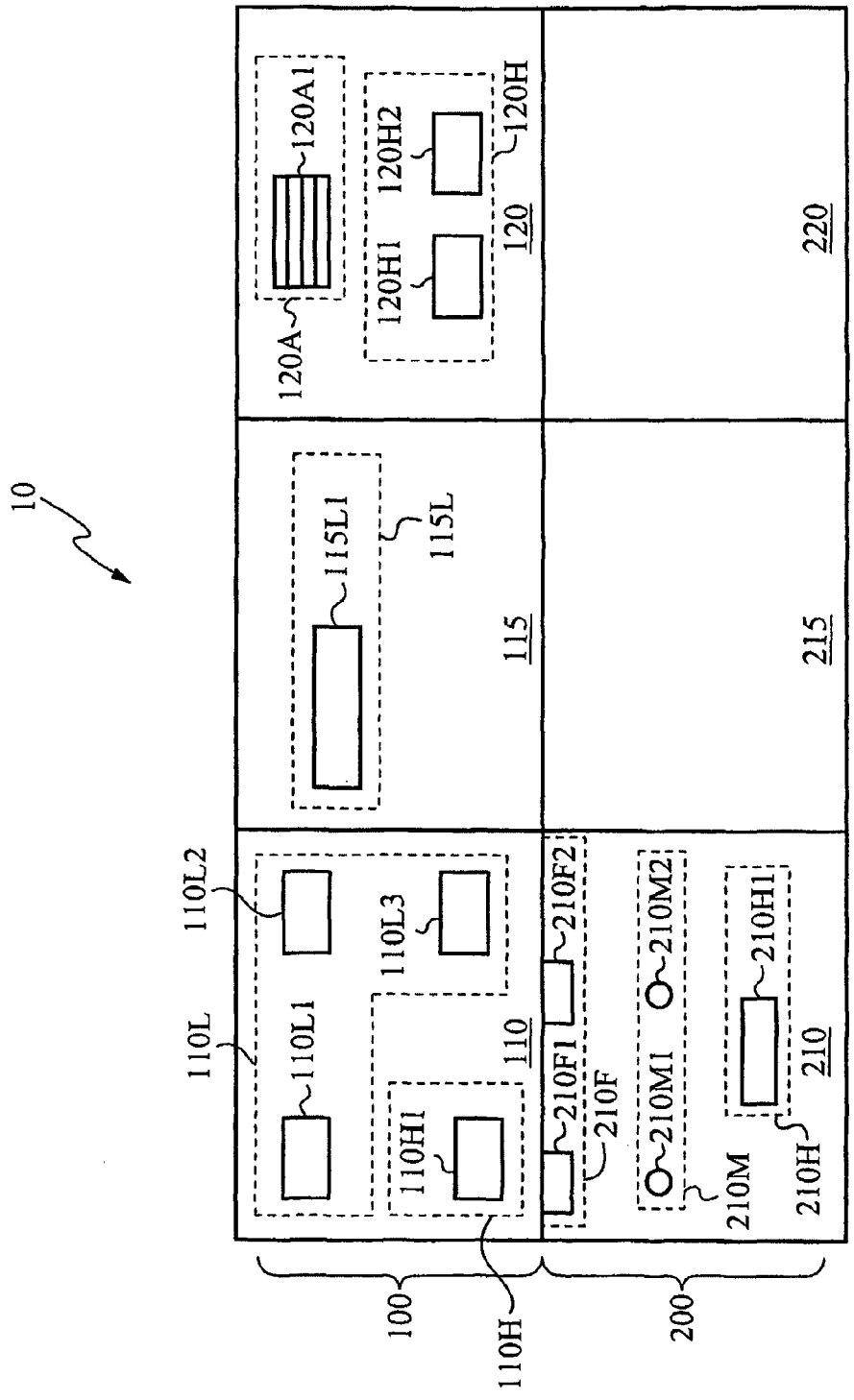
FIG. 1 is a schematic diagram of devices contained in a building and having location based addresses associated with each device's type, the office it is contained in, and the floor that each office is contained in, in accordance with the present invention.

To facilitate the clarity of the ensuing description, words listed below have been ascribed the following meanings:

1) LOCATION—A position in a spatial environment, as commonly defined by the planner or user of that environment. Generally, a location is specified, for completeness, in a hierarchical manner that serves to uniquely define the position, for example, as the "main conference room on the third floor of the main building". For most applications, a location corresponds to a place on, or section of, a building floor plan. For each location, there are often others that, by relation, are less or more specific than it, corresponding to higher or lower levels in the hierarchy; in the foregoing example, a less-specific location is the entire "third floor of the main building", while a more specific example might be the "speaker's podium of the main conference room on the third floor of the main building".

2) LOCATION DESCRIPTOR (LD)—An n-tuple that encodes a location, generally constructed with one field encoding each level of the corresponding hierarchy. For example, the first member might encode the building within a campus of buildings, the second member the floor within a selected building, the third a room on that selected floor, the fourth an area within the selected room, and so on.

3) LOCATION ATTRIBUTE—A characteristic associated with a level within the location hierarchy, often associated with a particular manner or pattern of use. A preset is the most common example of a location attribute. Each location can have zero, one, or many attributes associated with it.

4) LOCATION-BASED ADDRESS (LBA)—An n-tuple that encodes a location and optionally location attribute, and, when matched against one or more location descriptors and optionally location attributes, selects intended recipients for a message. The LBA is commonly encoded so that one particular value for each field in then-tuple is a "wild card", matching any possible value in that field. An LBA is said to match an LD if and only if each field of the LBA exactly matches the corresponding field of the LD, or if the field of the LBA is the wild card code.

5) PRESET—A recorded state for a device or devices, and, optionally, a time period over which the transition to the recorded state should occur. Each level in the location hierarchy can potentially have one or more presets associated with it. For example, a set of presets may be defined for each room in a house, while another disjoint set of presets may be defined for the whole house. In addition to the transition time noted above, each preset may additionally have an associated delay time, which must elapse before any transition from the present state to the recorded preset state may commence. Presets are most often associated with a particular use of the associated location. In the case of a conference room, possible uses might include "presentation", "discussion", "movie", "cleanup", and so on. Presets may also be associated with an event, or change-of-status, of the location, including the transition from a vacant to an occupied state, or vice-versa, an intrusion or security event, or a change in any characteristic of the environment (ambient light level, temperature, humidity, etc.).

6) SCENE—The state of the environment defined by recalling a particular preset in a given location, thereby setting all desired devices in that context into a state appropriate to a particular use.

To further clarify the above definitions, consider the case of a residence in a condominium complex. An example of a location might be:

West Building, Residence 110, Living Room

To express a location descriptor for a device installed in this location, an encoding must be chosen. The buildings in the complex could be numbered as follows:

East Building=1, West Building=2, North Building 3, South Building=4

The residence number can be used to encode the residence, or house. The rooms within a residence could be encoded as follows: Entrance Hall=I, Kitchen 2, Dining Room 3, Lavatory 4, Living Room 5, . . . .

The location descriptor describing the above mentioned location would then be: LD<BUILDING 2, HOUSE 110, ROOM=5>Let us further consider that there may be a number of presets associated with the living room; each such preset would have an encoding for presentation in a location-based address. In this case, one might have the following definitions:

Reading=1, Watching Television=2, Entertaining=3, Clean-Up=4, . . . .

To communicate only with those devices that would be used, in the living room, while watching television, the following location-based address could be used to direct the message:

LBA=<BUILDING 2, HOUSE 110, ROOM=5, AREA=ALL, PRESET=2>

As a second example, consider that a device is commissioned into Building 1, House 25, Room 4, we could have an LD that represented by:

LD~<Building=1, House=25, Room=4>

Given the description provided above, all of the following LBAs would match the LD=<Building. 1, House 25, Room=4>:

LBA0=<Building 1, House 25, Room 4> (an exact match)

LBA1<Building 1, House 25, Room=0> (matches all rooms in that house/building)

LBA2=<Building=1, House=0, Room=0> (matches all houses and rooms in that building)

LBA3=<Building=0, House=0, Room=0> (matches all possible LDs)
LBA4=<Building 0, House=25, Room=0> (matches any LD that has a House id of 25, regardless of its building id or room id)

The following LBAs would NOT match the given LD:
LBA5=<Building=4, House=25, Room=4> (building id differs)
LBA6==<Building=4, House=80, Room=0> (house id does not match, so wild card in room id field does not matter)

In accordance with the present invention, devices are commissioned with one or more Location Descriptors (LDs), preferably denoting the physical location of each device, such as determined by a floor plan. Pursuant to such commissioning, the devices can be operated, and can interoperate, by messages directed to spatial locations or addresses, rather than individual device addresses or logical addresses. As will be evident from the following discussion, the present invention simplifies the installation and maintenance of control networks, and decreases the communications bandwidth required to implement the control, thereby reducing product and maintenance costs.

The present invention is directed to a method of and a system for controlling electronic devices using location-based addresses (LBAs). As described above LBAs are part of the messaging data or a control signal that is broadcast or transmitted from a device to other "listening" devices. If a listening device has an LD that matches an LBA within a message data or the control signal that is broadcast or transmitted then the listening device will process the message data or control signal as a command. Alternatively, if any part of the LBA presented in the message data or control signal consists of a wild card code, then any value present in that corresponding part of the LD will be accepted as a match, and, if all other non-wild-card parts also match, the listening device will process the message data or control signal as a command. It. will be clear to one skilled in the art that a device can broadcast or transmit message data or control signals that are encoded for or contain more than one LBA and that listening devices can be commissioned with more than one LD.

The present invention advantageously uses location-based addressing to control devices such as light switches, light fixtures, air conditioning and heating units, motion detectors, fans, and any other devices that can be electrically controlled. Using the present invention, a transmitting device controls sets of devices by transmitting a control signal containing a location-based address (LBA) and a function code. All the devices configured to receive control signals can receive the control signal. After receiving the control signal, those devices in a corresponding set (e.g. having the corresponding LBA) will perform a function corresponding to the function code, such as adjusting a lighting level, turning on a fan, adjusting a thermostat, etc. The transmitting device can be a separate device used solely for controlling other devices, it is able to function as both a transmitting device and a receiving device, or it can be any other type of device.

Embodiments of the present invention have many useful applications in the home or office. For example, a home owner can program one or more sets of lights to have a common LD so that by pressing a button to invoke a single command lights along her walkway and in the Jiving room are automatically turned on, thereby creating a lighted and thus safe pathway from her garage and into her house. The present invention can be used to increase security in other ways. For example, the home owner can store information relating to light settings for each room when she is home. When she is away, these settings can be automatically recalled, giving would-be intruders the impression that she is home.

In a preferred embodiment, the devices to be controlled are part of an environment that has some inherent (generally, spatial) organization. The organization is two-dimensional, such as a floor plan of a single floor in a single building); or it is multi-dimensional, composed of many structures, with each structure having multiple floors and each floor having one or more plans.

In accordance with the present invention an address is not tied to a transmitting or receiving device, which can change, increase or decrease in number, or be replaced upon failure. Instead, each address is based upon an unchanging concept—a floor plan. Moreover, because most control operations performed in a facility are directed to some part or parts of the facility's floor plan, the addressing scheme allows the control to be achieved using the minimum number of messages. For example, all loads in a house can be turned off with a single message, by simply setting the LD to describe that part of the floor plan. The corresponding LB As can be more compact (requiring fewer bits for storage and transmission) than a traditional serial number or other unique identifier, as that must guarantee uniqueness across all such devices ever produced, in the entire world. In contrast, the LBAs must simply uniquely identify all separable parts of a typical floor plan.

LBA's must be used in communications schemes to permit the identification of intended recipients of a message or command, and to permit (optionally) the identification of respondents, when replies to such messages are sent.

The location-based address is an n-tuple that describes all or a portion of the available control environment in a uniform manner. Thus, each installed device possesses one or more location descriptors, each an n-tuple describing where it finds itself in the environment. Although normally a device has a single location, it may possess more, as the environment can change in some situations. For example, a movable partition or wall may temporarily divide a single large room into smaller rooms, as is commonly done in ballrooms in hotels. A device in such a facility is able to have two different location descriptors, one for the case where the partition wall is open, and another for the case when it is closed. If the device itself cannot be made aware of whether the partition wall is presently open or closed, it can simply store both states and respond to either.

The hierarchical n-tuple has an immediately useful meaning to a variety of people such as a constructor, maintainer, owner, and user of the space in question, much more meaning than, for example, an arbitrary number assigned to a device, such as a serial number.

The device wishing to initiate a change in the environmental state sends a message, containing an address that consists of another location descriptor, describing the subset of the environment that it wishes to operate upon, and an appropriate command (e.g. function) and data. Each receiving device compares the LBA in the received message to its set of location descriptors. If the LBA matches one of those descriptors, the receiving device will act upon the message. If the LBA does not match one of those descriptors, the receiving device will ignore the message.

Preferably, the LBA's are structured in a hierarchical manner: In this way, devices can belong to more than one LBA, such as to a first higher-level LBA corresponding to a house and also to a second lower-level LBA corresponding to a room contained in the house. A control signal addressed to the high-level LBA can thus be used to control all the devices in the house and a control signal addressed to the second lower-level LBA can be used to control devices in the room contained in the house. Using such a hierarchical LBA structure, sets of devices can be easily controlled.

As used herein, an LBA refers to an address that preferably corresponds to a particular location. For example, if a house location is specified by the address 1111 and a room location specified by the address 2222, a device's complete LBA can be represented by the LBA 11112222. Control signals addressed to the LBA 11112222 and containing a function code can be used to control the devices in the room, etc. Devices can be thought to belong to several hierarchical domains, all but the first being a sub-domain of a higher-level domain. Each device can therefore be considered to have multiple corresponding LDs.

As used herein, a control signal is an analog or digital data stream used to control a device and includes an LBA and a function code. The function code corresponds to a function that a device can perform. Thus, when a device with a corresponding LD receives a control signal containing a function code corresponding to the turning off the device, the device will power off when it receives the control signal. A control signal can be transmitted from a transmitting device for controlling one or more receiving devices. A single device is able to function both as a transmitting device and as a receiving device and can thus be equipped with a transceiver to both transmit and receive control signals. As described in more detail below, in one embodiment, pressing one or more buttons on a panel of the transmitting device can generate control signals•that are used to control devices commissioned to have a particular LD.

FIG. 1 is a schematic diagram of a building 10 used to describe how to control devices using location-based addressing in accordance with the present invention. The building 10 contains a first floor 100 and a second floor 200. The first floor 100 contains a first room 110, a second room 115, and a third room 120. The first room contains a first set of devices 110L and a second set of devices 110H. The first set 110L contains the light fixtures 110L1, 110L2, and 110L3, all having a common LD (such as a an LD designating a set within a room, where the room is on a particular floor within a particular building) and controllable in accordance with the present invention using corresponding LBAs. The assignment to a particular set is based on the physical location within the room and also by the device type, here, light fixtures. The second set of devices 110H contains the electrical heater 110H1 having associated with it (e.g. stored in its memory) one or more LDs and controllable using corresponding LBAs.

Preferably, devices are commissioned into a set of devices that are proximate to each other, such as when the devices in the set are all contained in a single room or in a single partitioned area. It will be appreciated, however, that devices can be commissioned into a single set even though they are not all proximate. Devices can thus be commissioned into a set to fit any application at hand. For example, all the desk lamps in all the rooms in a building can be commissioned into one set. By addressing a control signal to this set (e.g. using the LBA corresponding to LDs of this set), all of the lamps can be controlled so that they all turn on at a pre-determined time.

In accordance with the present invention, the lighting fixtures 110L1, 110L2, and 110L3 each can be turned on or off and can have each of their lighting intensities adjusted merely by adjusting the settings on a single transmitting device. The on, off, and adjustment capabilities correspond to the functions that can be performed on each of the lighting fixtures 110L1, 110L2, and 110L3 in accordance with the present invention. Similarly, functions performed on the electrical heater 110H1 in accordance with the present invention include, but are not limited to, turning it on or off or adjusting its temperature using a thermostat. Thus, by activating a single transmitting device, all devices in a set can be controlled to have the same settings. As described above and below, each of the lighting fixtures 110L1, 110L2, 110L3 is able to function as both a transmitting device and a receiving device (i.e. a controlling device and a controlled device). Thus, if the lighting fixture 110L1 functions as a transmitting device, when the settings on the lighting fixture 110L1 are changed, the lighting fixture 110L1 transmits control signals that automatically adjust the settings on the lighting fixtures 110L2 and 110L3 to mirror the settings on the lighting fixture 110L1.

As described above and in more detail below, the set 110L is responsive to multiple LBAs. For example, one LBA associated with the set 110L corresponds to the building 10 containing the set 110L. A second LBA associated with the set 110L corresponds to the floor 100 containing the set 110L. A third LBA associated with the set 110L corresponds to the office 110 containing the set 110L. A fourth LBA associated with the set 110L corresponds to a device type of the group set 110L. Thus, a transmitting device can control the devices in the set 110L using any one of the following addresses: (1) an LBA corresponding to the building 10 (and thus all of the devices in the building 10), (2) an LBA corresponding to the floor 100, (3) an LBA corresponding to the room 110, or (4) an LBA corresponding to the set (e.g. device type) 110L. Thus, for example, all of the devices in the group set 110L can be turned on by transmitting a control signal containing the function code TURN_ON and any one of the following LBAs: building 10, floor 100, room 100, or group set 110L.

Still referring to FIG. 1, a control signal containing the function code TURN_ON and the LBA corresponding to the set 110L will turn on the devices in the set 110L but not those in the set 110S. Preferably, the control signal is an anonymous multicast control signal, described in more detail below. It will be appreciated that a set can be configured so that some or none of its members are contained in a hierarchical set (e.g. set 110L) and the remainder of its members are not contained in the same hierarchical set. Thus, for example, a set can be configured to contain the devices, 110L1, 110L2, 110L3, and 210H1, which, as described below, are contained in the room 210. It will be appreciated that sets can be configured to contain any combination of devices that can receive the transmitted control signal, determined by the application at hand.

In accordance with one embodiment, a control signal is transmitted multiple times to ensure that a receiving device receives the control signal. In this embodiment, the receiving device does not transmit a response signal to the transmitting device. Response signals are used to notify the transmitting device that the receiving device received the control signal. Instead, in this embodiment, the transmitting device transmits the control signal a pre-determined number of times, thereby increasing the likelihood that the receiving device receives the control signal. Thus, even when interference prevents the receiving device from receiving one transmission of the control signal, the receiving device can receive other transmissions after the interference has subsided. Thus, multiple transmissions of a control signal can be used as a fail-safe method.

The elements in FIG. 1 are now discussed to describe other embodiments of the present invention. The second room 115 contains the set 115L comprising the light fixture 115L1. The third room 120 contains the set 120A and the set 120H. The set 120A comprises the air-conditioning unit 120A1. The set 120H comprises the electrical heaters 120H1 and 120H2.

The second floor 200 contains a first room 210, a second room 215, and a third room 220. The first room 210 contains a first set of devices 210F, a second set of devices 210M, and a third set of devices 210H. The first set of devices 210F contains a first fan 210F1 and a second fan 210F2. The second set of devices 210M contains a first motion detector 210M1 and a second motion detector 210M2. The third set of devices 210H contains the electrical heater 210H1. The second room 215 and the third room 220 contain no sets of devices.

As discussed above, sets of devices can be configured in different ways. For example, a set can be formed by commissioning into the set a first set of lights in a first room and a second set of lights in a second room. Sets can thus be organized quickly and easily using location, type, other factors, or any combination of these to fit the application at hand.

Figure 2:
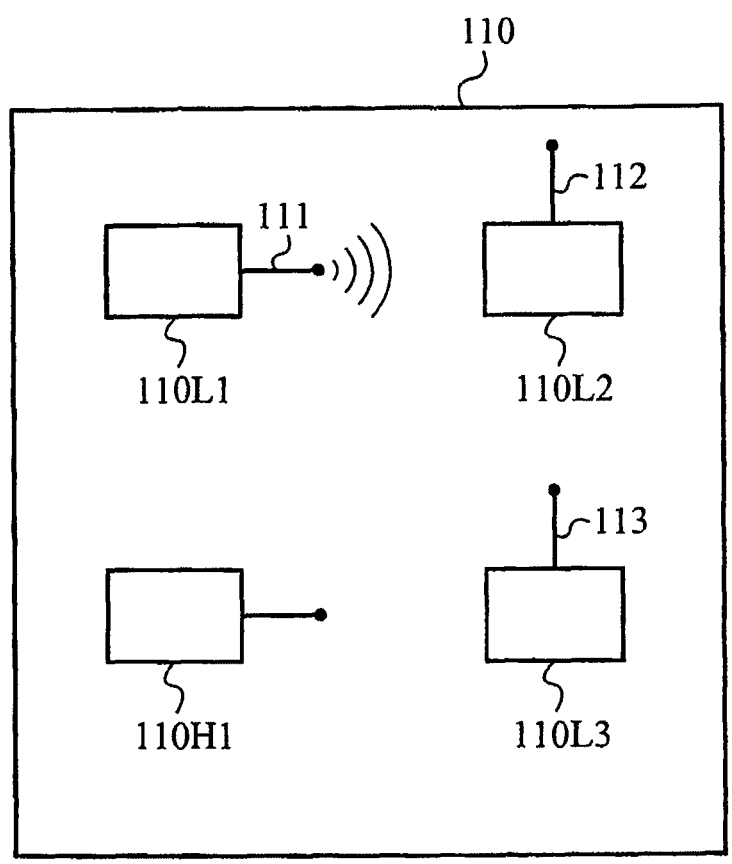
FIG. 2 is a diagram of two groups of devices contained in a room, a first device in a first set controlling the other devices in the first set but not the devices in the second set, in accordance with the present invention.
Figure 3:
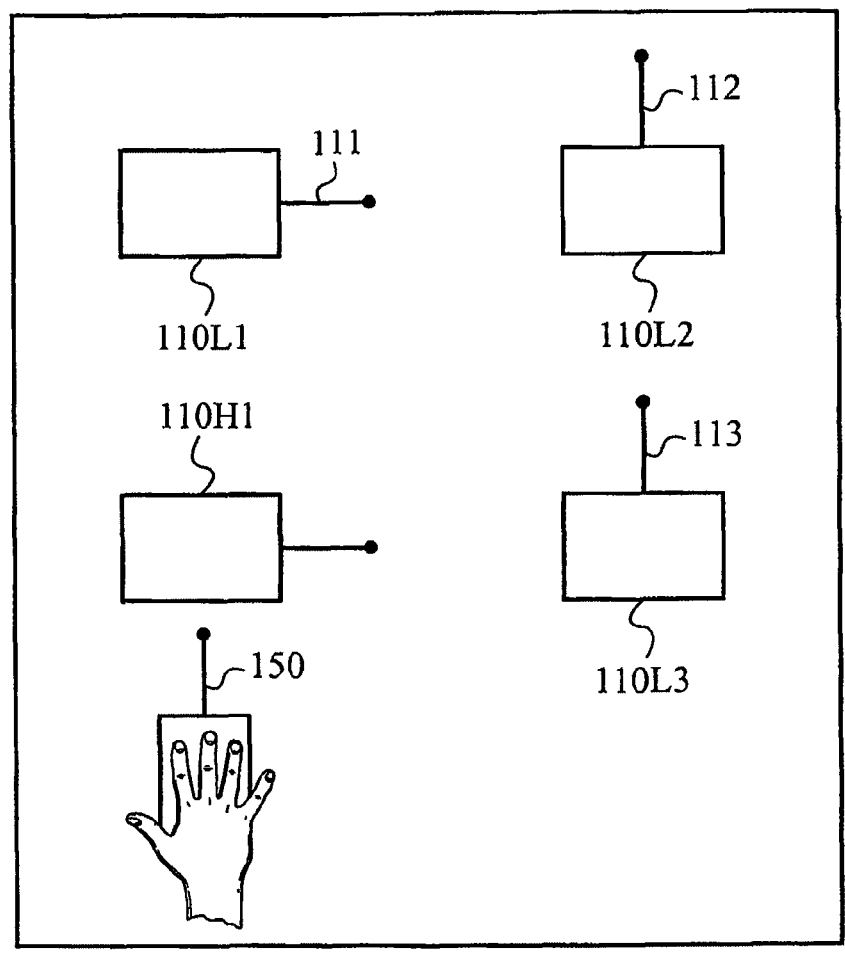
FIG. 3 is a diagram of a portable device used to control the devices in the first set of FIG. 5, in accordance with the present invention.

FIG. 2 is a schematic diagram of the room 110 shown in FIG. 1. FIG. 2 shows a receiving device 100L1 that also functions as a transmitting device. In this configuration, the receiving device is referred to as a master receiving device 110L1. The master receiving device 110L1 transmits a control signal to the devices 110L1, 110L2, and 110H1 in the room 110. The control signal has a target address (also referred to as the target LBA or destination address) corresponding to the set 110L. All of the devices 110L2, 110L3, and 100H1 receive the control signal, but because only the devices 110L2 and 110L3 are commissioned to have the destination address LD corresponding to the set 110L, only they are controlled by the control signal. That is, only devices 110L2 and 110L3 will perform the function corresponding to the function code (e.g. turn on, turn off, adjust one or more settings) contained in the control signal. It will be appreciated that in one embodiment forming a peer-to-peer system, each of the devices 110L1, 10L2, and 110L3 is able to function as both a transmitting device and a receiving device. Preferably, the transmitting device 100L1 is fixed in the room, connected by a socket, cabling, or the like. FIG. 3 shows the room 110 of FIG. 1, with a portable (e.g. non-fixed) control device 150.

Figure 4:
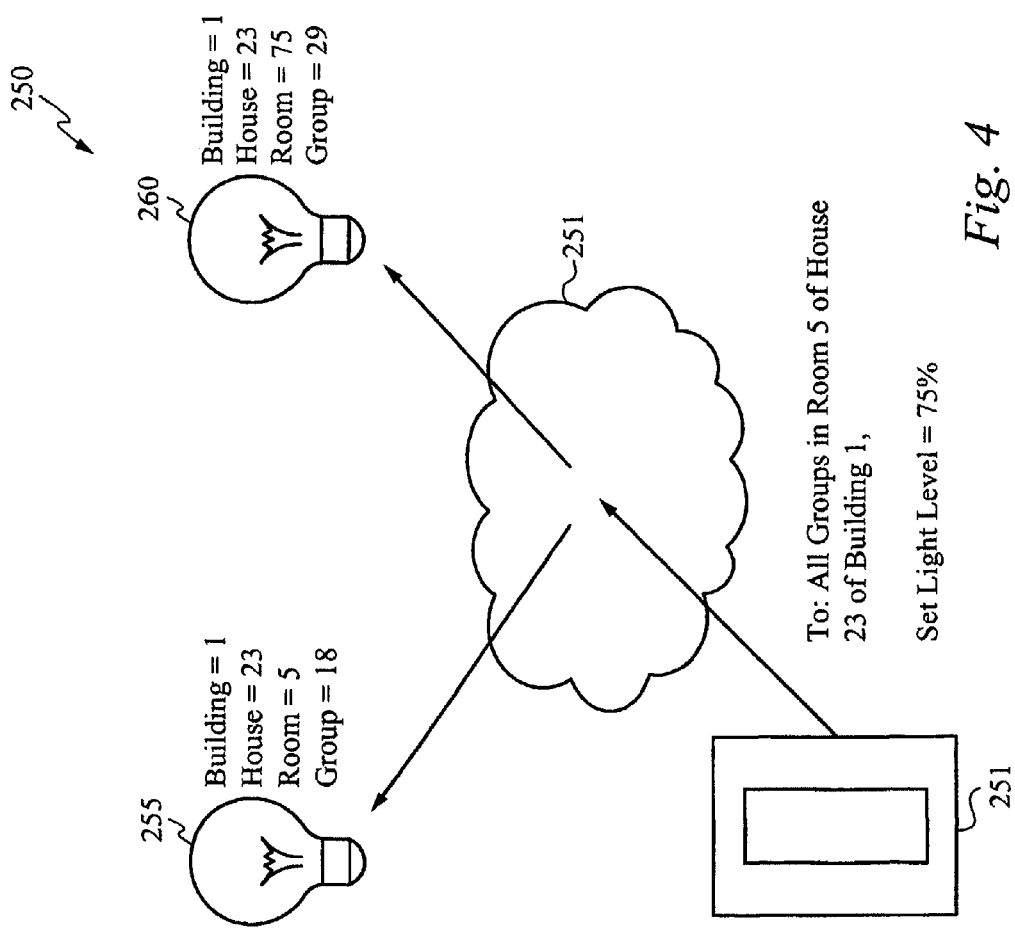
FIG. 4 is a schematic of a transmitting device controlling a receiving device using a location-based address in accordance with the present invention.

FIG. 4 illustrates a system 250 for controlling a device in accordance with the present invention. The system 250 comprises a transmitting device 251, a transmission medium 251, a first device 255 contained in a first set of devices, and a second device 260 contained in a second set of devices. As illustrated in FIG. 3, the transmitting device transmits a control signal containing a transmitted LBA and a function code. The LBA corresponds to room 5 (e.g. all the sets in room 5) and the function code corresponds to the command for setting the lighting level to 75% of a lighting unit's maximum value. The control signal is transmitted over the transmission medium 251 to lighting units 255 and 260. The lighting unit 255 receives the transmitted control signal and because its LD matches or corresponds the transmitted LBA it adjusts its lighting level to 75% of its maximum value, thereby dimming its lighting level and saving energy. The lighting unit 260 also receives the transmitted control signal but because its LD does not match the transmitted LBA, it does not adjust its lighting level.

As described in more detail below, the transmission medium 251 can comprise a wireless medium, a hard-wired medium, or a combination of both. If the transmission medium 251 comprises a wireless medium, the transmitting device 251 can transmit the control signal using radio frequency (RF) waves, infrared signals, or other electromagnetic radiation. Preferably, the transmitting device 251 transmits control signals using RF signals at frequencies set aside for low-power devices, frequencies such as those operating in the Ultra High Frequency (UHF) Industrial, Scientific, and Medical (ISM) band, approximately 902-928 MHz. The ISM band is un-licensed and, because it contains low frequencies, components communicating over that band can use inexpensive components to both transmit and receive signals. It will be appreciated, however, that RF signals having other frequencies can also be used, including but not limited to those in other un-licensed frequency bands that are now or may later become allocated. Hard-wired media that can also be used in accordance with the present invention include, but are not limited to, Ethernet cables, fiber-optic cables, power lines (e.g. in a power line network), and any other media that allows commands and data to be transmitted to multiple electrical devices.

Figure 5A:
FIG. 5A is a high-level diagram of a building containing houses, used to describe location-based addressing in accordance with the present invention.
Figure 5B:
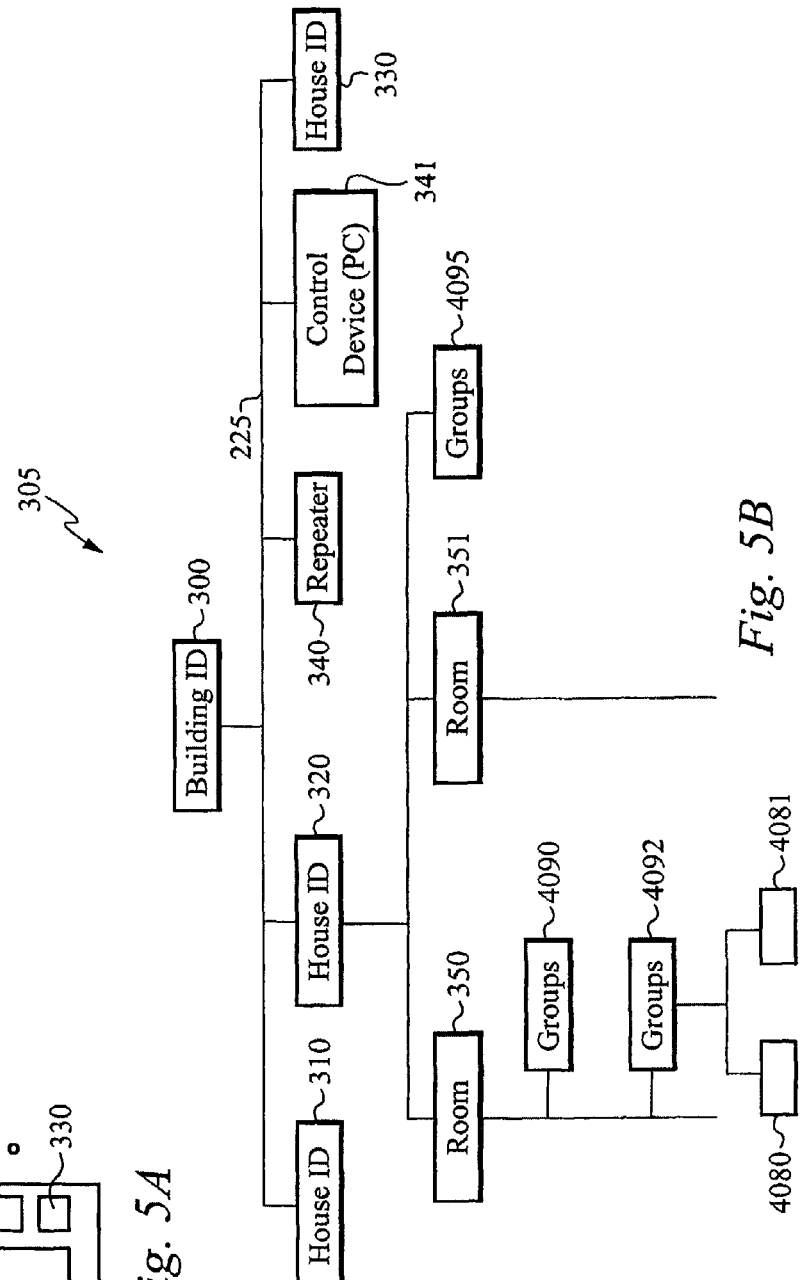
FIG. 5B is a hierarchical and physical diagram showing domains containing devices and how the hierarchical relationship is used to build a location-based address in accordance with the present invention.

In accordance with the present invention, electrical devices are grouped into logical hierarchical domains that correspond to the physical location of the electrical devices. FIGS. 5A and 5B are used to describe hierarchical domains and how an LBA is formed in accordance with one embodiment of the present invention. FIG. 5A is a high-level schematic of a building 300 containing a plurality of houses 310, 320, and 330. As described below, a building contains a house, which contains several rooms, each containing sets of devices. Houses within a building can be connected by repeaters and can also contain personal computers each functioning as a transmitting device and used to collect information about the devices and transmitting devices in a particular domain.

FIG. 5B is used to describe how the building, houses, rooms, sets, and devices are logically grouped into a hierarchical structure used to form location-based addresses. Preferably, the logical structure also mirrors the physical layout of the building, houses, rooms, sets, and devices to form LBAs, but this is not a requirement.

As illustrated by the hierarchical or tree structure in FIG. 5B, the building 300 contains a first domain comprising a house 310 represented by the house ID 310, a house 320 identified by a house ID 320, a house 330 identified by the house ID 330, a repeater 340, and a transmitting device 341. The building 300 is coupled to the first domain by a bus 225, preferably a wireless medium. To simplify the following discussion of FIG. 5B, numeric labels will refer to both the physical location (e.g. house 320) and the location ID (e.g. house ID 320). The house 320 contains a second domain (a sub-domain) containing a first room 350 identified by the room ID 350, a second room identified by the room ID 351, and a first set 4095 identified by the set ID 4095. The room 350 contains a third domain containing a second set 4090 and a third set 4092. The third set 4092 contains a first receiving device 4080 and a second receiving device 4081. The receiving devices 4080 and 4081 can be any electrical device including, but not limited to, a lighting unit, an air-conditioning and heating unit, and a motion detector.

The architecture of the system 300 thus both logically and physically comprises an upper-level domain containing one or more sub-domains, with each sub-domain further comprising either another domain or a set of devices. Still referring to FIG. 5B, an upper-level domain refers to the building 300, which contains the sub-domains referring to the houses 310, 320, and 330, the repeater 340, and the transmitting device 341. The sub-domain house 320 contains a sub-domain containing the room 350, the room 351, and the first set 4095. The room 350 contains two sub-domains, a second set 4090 and a third set 4092. The third set 4092 contains two devices, a first device 4080 and a second device 4081. It will be appreciated that connecting lines in FIG. 5B (e.g. bus 225) are shown merely to illustrate the hierarchical or tree structure of the environment and do not represent hard-wired connections. It will also be appreciated that FIG. 5B shows a hierarchical structure in accordance with one embodiment of the present invention. Other hierarchical structures are contemplated by the present invention.

In one embodiment, an LBA is generated by concatenating a unique physical address onto a root LBA. One example of a root LBA is the LBA formed by concatenating a building ID, a house ID, a room ID, and a set ID. In one embodiment, the unique physical address is the media access control (MAC) address of a network interface card that couples a building to the Internet. Thus, still referring to FIG. 5B, and using the element labels as the IDs for the corresponding element, if a MAC address is 1234, an LBA corresponding to the device 4080 is formed by concatenating the MAC address 1234 with the ID's formed by traversing the hierarchical structure 305 starting from the building ID to the device ID 4080, thus forming the LBA: 1234 300 320 350 4092 4080.

By setting the address of a sub-domain to all 0's (or any other wildcard sequence), all of the elements in the parent domain can be addressed and thus controlled. Thus, to address (and thus control) all of the devices in the house 320, the LBA 1234 300 320 000 XXXX XXXX can be used, where X is any number. To address (and thus control) all the devices in the room 350, the LBA 1234 300 320 350 0000 XXXX can be used. In one embodiment, when a receiving device compares its commissioned (e.g. stored) LD with the LBA contained in a transmitted control signal, the receiving device will compare portions of each LBA until it reaches a block of 0's. If the LBA's match to that point, the receiving device will determine that it is a member of the set associated with the LBA contained in the control signal. The receiving device will then perform the function associated with the function code contained in the control signal. It will be appreciated that a wildcard string can occur at any component of an address structure in accordance with the present invention.

In other embodiments, values after the wildcard string are not ignored but are used to control one or more sets of devices. Thus, for example, the LBA 1234 300 320 000 456 789 is used to address, in all the rooms in the house 320, all devices within the Group ID 456 and having a Device ID 789. Using this structure, different rooms in a building can all have the same group identifier and device identifier. It will be appreciated that any number and types of devices can be addressed and controlled in accordance with the present invention. For example, FIG. 5B shows a repeater 340 used to extend the range of a control signal transmitted from a transmitting device. It will be appreciated that the repeater 340 is used when control signals are transmitted using electromagnetic radiation such as RF signals.

FIG. 6 is a high-level diagram of a signal structure 400 (e.g. a data structure) that is encoded onto a control signal in accordance with one embodiment of the present invention. The signal structure 400 comprises an address structure 405 containing address information and a control structure 410 containing control information. The address information contains a location-based address for target devices that are to be controlled by the control signal. The control information contains information that instructs the target devices to perform a selected task such as turning on, turning off, or otherwise adjusting a setting.

FIG. 7A shows a template 420 for a first address structure in accordance with one embodiment of the present invention. The template 420 has a first field 425 for containing a building identifier, a second field 430 for containing a house identifier, a third field 435 for containing a room identifier, a fourth field 440 for containing an area identifier, and a fifth field 445 for containing a device identifier. It will be appreciated that the fields 425, 430, 435, 440, and 445 together form a location-based address in accordance with the present invention. As described in more detail below, each of the fields 425, 430, 435, 440, and 445 can contain a text string (e.g. "North Tower"), a number (e.g. "23"), a combination of alphanumeric characters, or any symbols for uniquely identifying a building, a house, floor, a room, an area, one or more electrical devices, or any other physical area or component as, for example, described in a floor plan.

FIG. 7A shows an address structure 420' corresponding to the template 420 using numbers stored in the fields in the address structure 420'. In one example, buildings in a residential community are numbered 1 to 10, houses within each building are numbered 1 to 20, rooms within each house are numbered 1 to 50, areas within each room are numbered 1 to 5, and devices within each room are numbered 1 to 16. FIG. 7A shows one structure 420' in accordance with the present invention for addressing a target device (1) in a particular area (5) of a particular room (3) in a particular house (15) in a particular building (6). The structure 420' addresses the device by storing in the field 425' the number 6, corresponding to building 6; in the field 430' the number 15, corresponding to house 15 within the building 1; in the field 435' the number 3, corresponding to the room 3 within the house 15; in the field 440' the number 5, corresponding to the area 5 within the room 3; and in the field 445' the number 1 corresponding to a device or a set of devices 1 within the area 5. Thus, by addressing a single control signal having the address structure 420' and control information (discussed below) with a function corresponding to a power off command, all of the devices in the device set 1 will turn off.

As used herein, the fields of an address structure are referred to as a target element. Thus, the number 6 contained in the field 425' is referred to as the target house, because it receives and is controlled by the control signal containing the control structure 420. Similarly, the number 15 contained in the field 430' is referred to as the target house; the number 3 contained in the field 435' is referred to as the target room; the number 5 contained in the field 440' is referred to as the target area; and the number a contained in the field 445' is referred to as the target device of the target set of devices. This terminology is used regardless of the data type contained in a field. Thus, for example, a target house can refer to a text string such as "North Tower", as described below.

FIG. 7B shows an address structure 420" having the same fields as that shown in FIG. 7A but using text strings. The field 425" contains the text string "North Tower", identifying the target building, the field 430" contains the text string "Taylor House" identifying the target house, the field 435 "contains the text string "Living Room" identifying the target room, the field 440" contains the text string "Fireplace" identifying the target area with the room, and the field 445" contains the text string "Mantelpiece Lamp" identifying the device to be controlled.

FIG. 8 shows a second template 500 for an address structure in accordance with another embodiment of the present structure. The template 500 has a first field 525 for storing a building identifier for identifying a building, a second field 530 for containing a floor identifier for identifying a floor within the building, a third field 535 for containing a room identifier for identifying a room on the floor, a fourth field 540 for containing an area identifier identifying an area within the room, and a fifth field 545 for containing a device identifier identifying a device within the area. It will be appreciated that address structures in accordance with the present invention can have any number of fields containing any types of identifiers determined, for example, by a physical layout of an area reflected in a floor plan.

While FIGS. 7 A-C and 8 illustrate examples of address structures that form part of a signal structure, signal structures also contain control structures. While the address structure contains information that determines which devices or sets of devices are controlled by a control signal (the target devices), the control structure contains information that determines what functions are performed by the target devices. For example, the control structure can contain information that instructs the target devices to turn on, turn off, or adjust their settings. Other embodiments of control structures are described in more detail in FIGS. 9 and 10 below.

Figure 9:
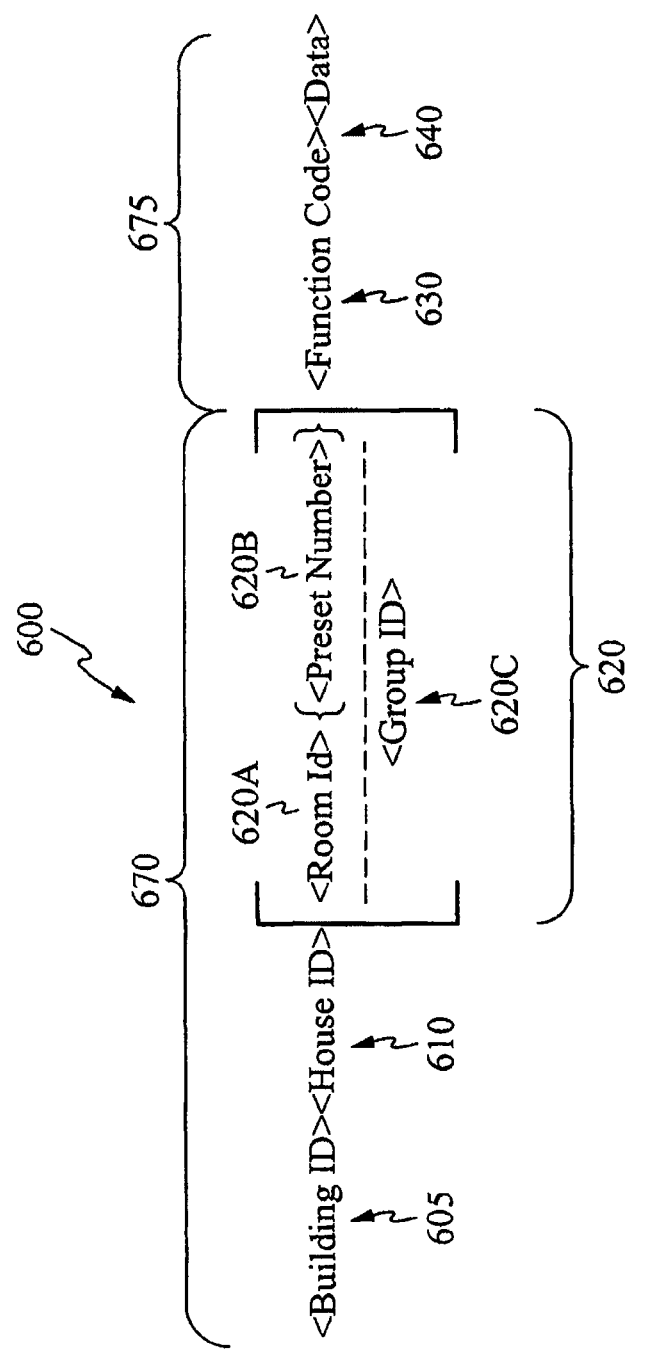
FIG. 9 is a diagram of a data structure encoded onto a control signal and used to control a receiving device in accordance with the present invention.

FIG. 9 illustrates a template 600 for a control structure contained in (e.g. encoded onto) a control signal and used to control a device in accordance with one embodiment of the present invention. The template 600 comprises an address structure 670 and a control structure 675. The address structure 670 comprises a Building ID field (BldgID) 605, a House ID field (HID) 610, a Group-Preset block 620, a Function code field 630, and optional Data field 640. The Group-Preset block 620 can contain either (1) a Room ID 620A and an optional Preset Number 620B or (2) a Group ID 620C. Here, the values of each field are determined by its location in the data structure. The Preset Number 620B is a number that can be used when a receiving device is initialized and refers to a particular sequence of steps that the receiving device can execute. It will be appreciated that the information can have many formats and can include other control information including, but not limited to, field delimiters, start and stop bits, and redundant data. As discussed in more detail below, the control signal can be encapsulated in a control packet that includes an address of the sending device (a source address), an address of the receiving device (a destination address), or both. Including these addresses allows transmitting devices and receiving devices to exchange response messages as part of a handshaking protocol.

Figure 10:
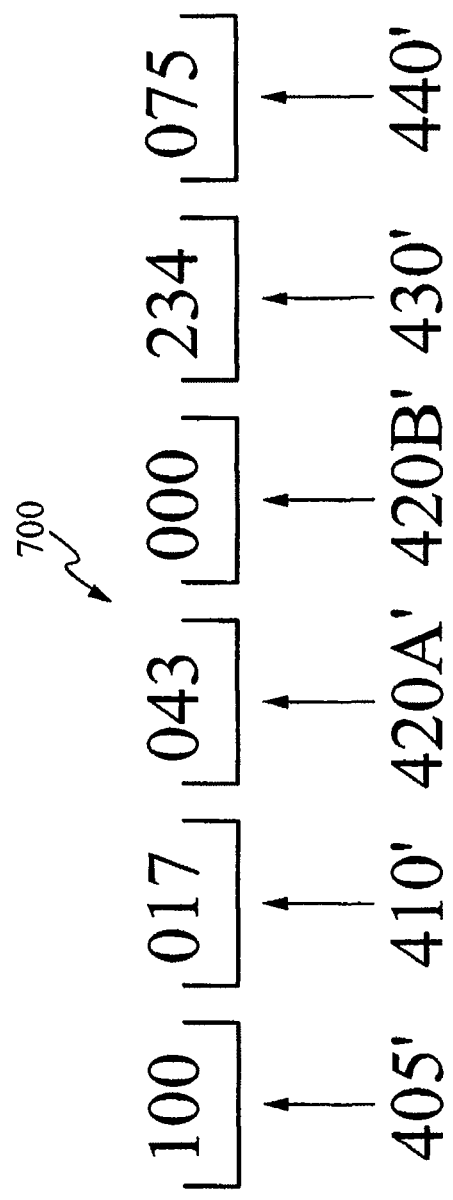
FIG. 10 is a diagram of a hierarchical location-based address in accordance with the present invention.

FIG. 10 shows a control (e.g. data) structure 700 encoded onto a control signal in accordance with the present invention. The control structure 700 contains a first field 405' containing the value 100 (corresponding to a Building ID of 100), a second field 410' containing the value 017 (corresponding to a House ID of 017), a third field 420A' containing the value 043 (corresponding to a Room ID of 043), a fourth field 420B' containing the value 000 (corresponding to a preset number of 000), a fifth field 430' containing the value 234 (corresponding to a function code of 234), and a sixth field 440' containing the value 075 (corresponding to data of 075). Thus, for example, a transmitting device can send a control signal to change the lighting level of lighting units in a room identified by the Room ID=043, the room in a house identified by the House ID=017, the house in a building identified by the Building ID=100. As one example, the function code 234 is recognized by the lighting units (e.g. receiving devices) as the function code for adjusting the lighting, and the data field 440' contains a number (075) corresponding to the level the lighting level is to be changed to, here 75% of its maximum value. Here, because the lighting units have already been initialized, there is no preset number and its value is set to 0000 since the lighting units have all been initialized. In this example, the data structure will contain the data 100 017 043 000 234 075.

It will also be appreciated that control signals can have other formats. For example, as described above, in one embodiment, a field in a control signal can be determined by its position in the data structure contained in the control signal. For example, the second field in the example above (017) will always correspond to a house ID. Alternatively, a field can be determined by the prefix of the value stored there. For example, any 4-digit field starting with the value 01 will correspond to a house ID, any 3-digit field starting with the value 04 will correspond to a room ID, etc. In this way, control signals can be shortened since not all fields are required to adjust a receiving device. In other words, fields are not required to serve merely as place holders.

It will be appreciated that the receiving devices can be controlled in other ways using other corresponding function codes. For example, the receiving device can be (1) turned on, (2) "turned off, (3) put into sleep mode, (4) queried for its status or for its history, such as the number of hours that it has been on for the week, the number of times it has been turned on or off or (5) otherwise adjusted. A receiving device can be adjusted by, for example, increasing its lighting level at a predetermined rate. Each such adjustment or other action to be taken by the receiving device will have a corresponding function code. Any number of actions taken by a receiving device and thus corresponding function codes can be used in accordance with the present invention, limited only by the application at hand.

In one embodiment of the invention, a transmitting device can transmit a control signal containing a QUERY command code (a query message). When the devices having the targeted LD receive the query message, each responds by transmitting a control signal (a response message) containing, in its data fields, statistical data about its usage or the usage of nearby receiving devices. In one embodiment, the statistical data includes the number of hours a device was ON in the past month, the last date the device was serviced, etc. The transmitting device receives these response messages and stores them in a log file or transmits them to another host for storage in a log file for processing. Usage statistics and other information can then be calculated for tracking device usage at a particular site. Such usage statistics can be used for maintenance, for security, to develop operation protocols, or for other purposes.

Figure 11:
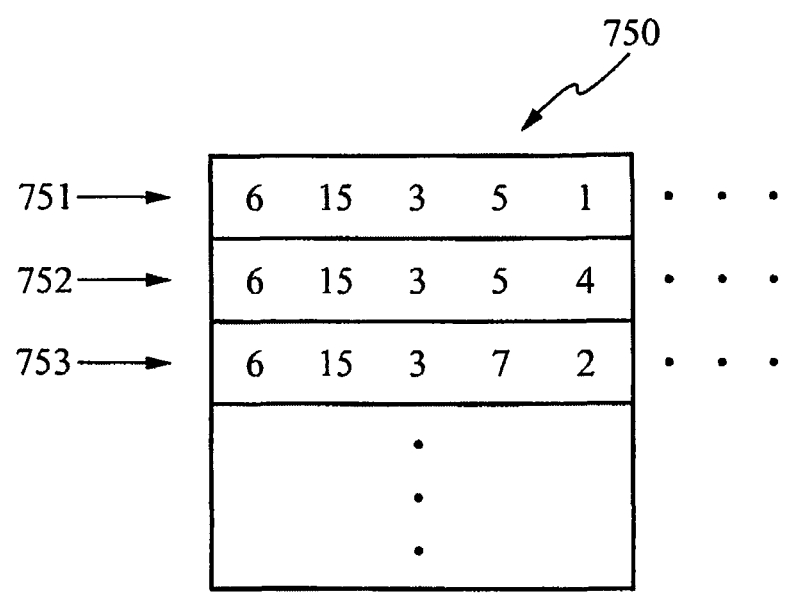

FIG. 11 is one embodiment of a table 750 contained in a memory of a receiving device, such as the logic/memory unit 815 described below in FIG. 12, in accordance with one embodiment of the present invention. The table 750 contains entries 751, 752, and 753, each containing an LBA directed to a group into which the receiving device has been commissioned with a corresponding LD. As illustrated in FIG. 11, the receiving device has been commissioned into and is concurrently part of the groups with LDs 615351 (entry 751), 615354 (entry 752) and 615372 (entry 753). Thus, when a control signal having a transmitted LBA is transmitted, the receiving device will compare the transmitted LBA against the LDs stored in the entries 751, 752, and 753 until it finds a match. If a match is found, the receiving device will perform the function associated with the function code contained in the control signal. Otherwise, the receiving device will take no action.

Figure 12:
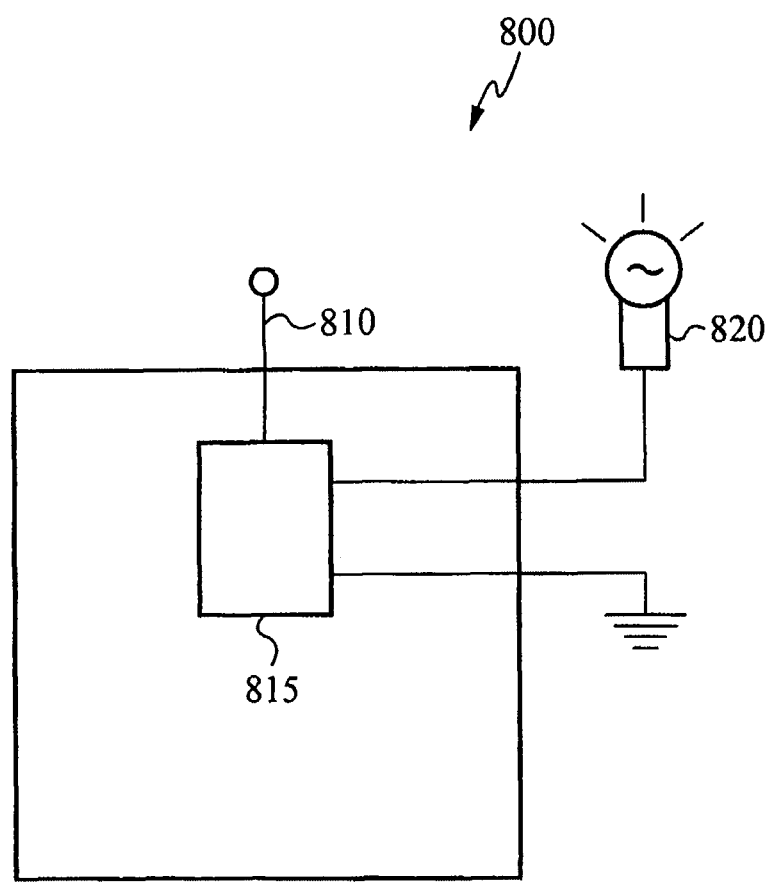
FIG. 12 is a schematic of a lighting unit controlled using location-based addressing in accordance with the present invention.

FIG. 12 is a schematic diagram of a receiving device 800 in accordance with one embodiment of the present invention. The receiving device 800 comprises an antennae 810 coupled to a logic/memory unit 815, which in turn is coupled to a light bulb 820. The antennae 810 and logic/memory unit 815 together function as a transceiver, used to transmit and receive transmitted control signals in accordance with the present invention. The antennae 810 and logic/memory unit 815 together also function as a processor for (1) extracting a broadcast LBA and function code from a broadcast control signal, (2) comparing the broadcast LBA with an LD stored in the logic/memory unit 815 (the commissioned LD) and, if the two match, (3) performing a function associated with the function code. It will be appreciated that to simplify the discussion of the receiving device 800. FIG. 8 does not include other elements generally found in a receiver, transmitter, or transceiver, such as an oscillator, a filter, and a mixer.

In one embodiment, the logic/memory unit 815 is configured to control a voltage impressed across the light bulb 810, thereby controlling the intensity of the light bulb 810. In one embodiment, the logic/memory unit 815 thus functions in part as a remotely controlled dimmer switch. If the receiving device 800 also functions as a master receiving device or is configured to transmit usage data about the receiving device 800, then the logic/memory unit 815 also functions to translate LBA and function codes into control signals that are transmitted by the antennae 810 to a transmitting device or to other receiving devices.

It will be appreciated that the receiving device 800 can be coupled to a transmitting device, other receiving devices, or both using means other than or in addition to the antennae 810. These other means include, but are not limited to, a network interface card. It will also be appreciated that in one embodiment, a transmitting device has a structure similar to that of the receiving device 800.

Figure 13:
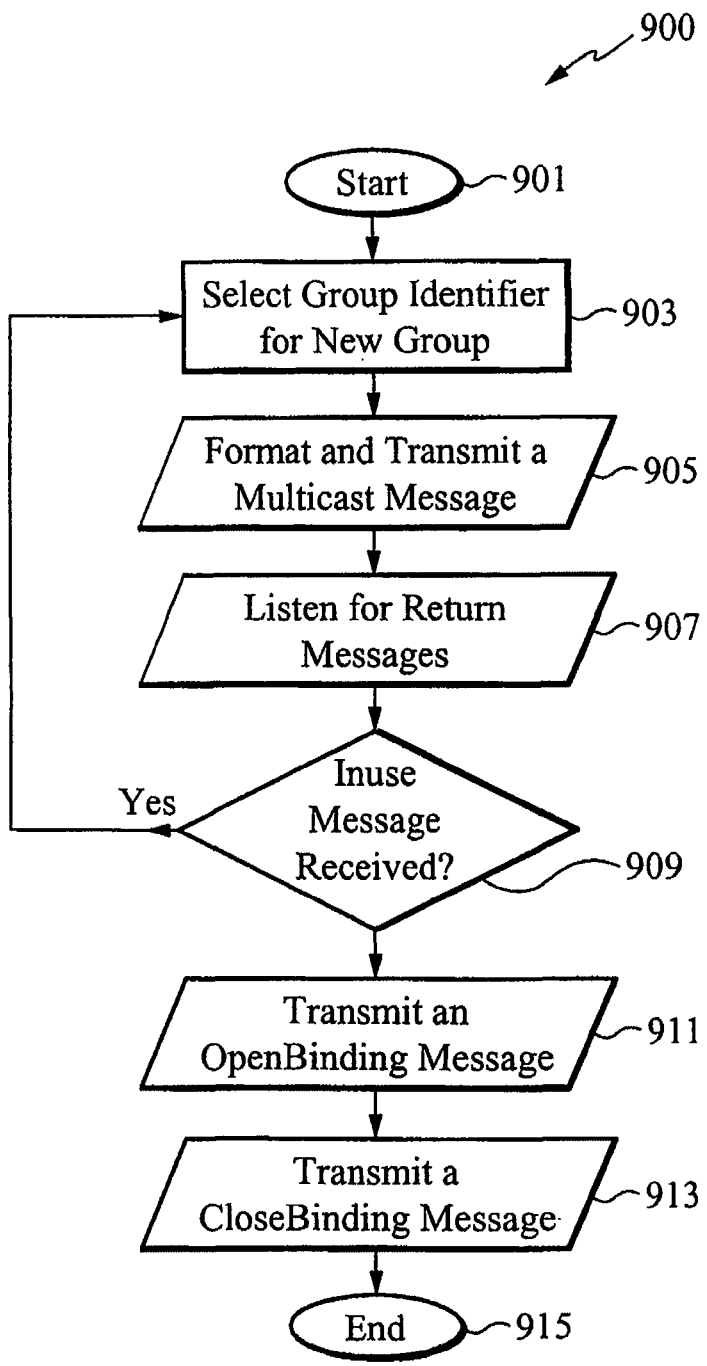
FIG. 13 is a flow chart for the steps performed when a first device commissions other devices into a set in accordance with the present invention.
Figure 14:
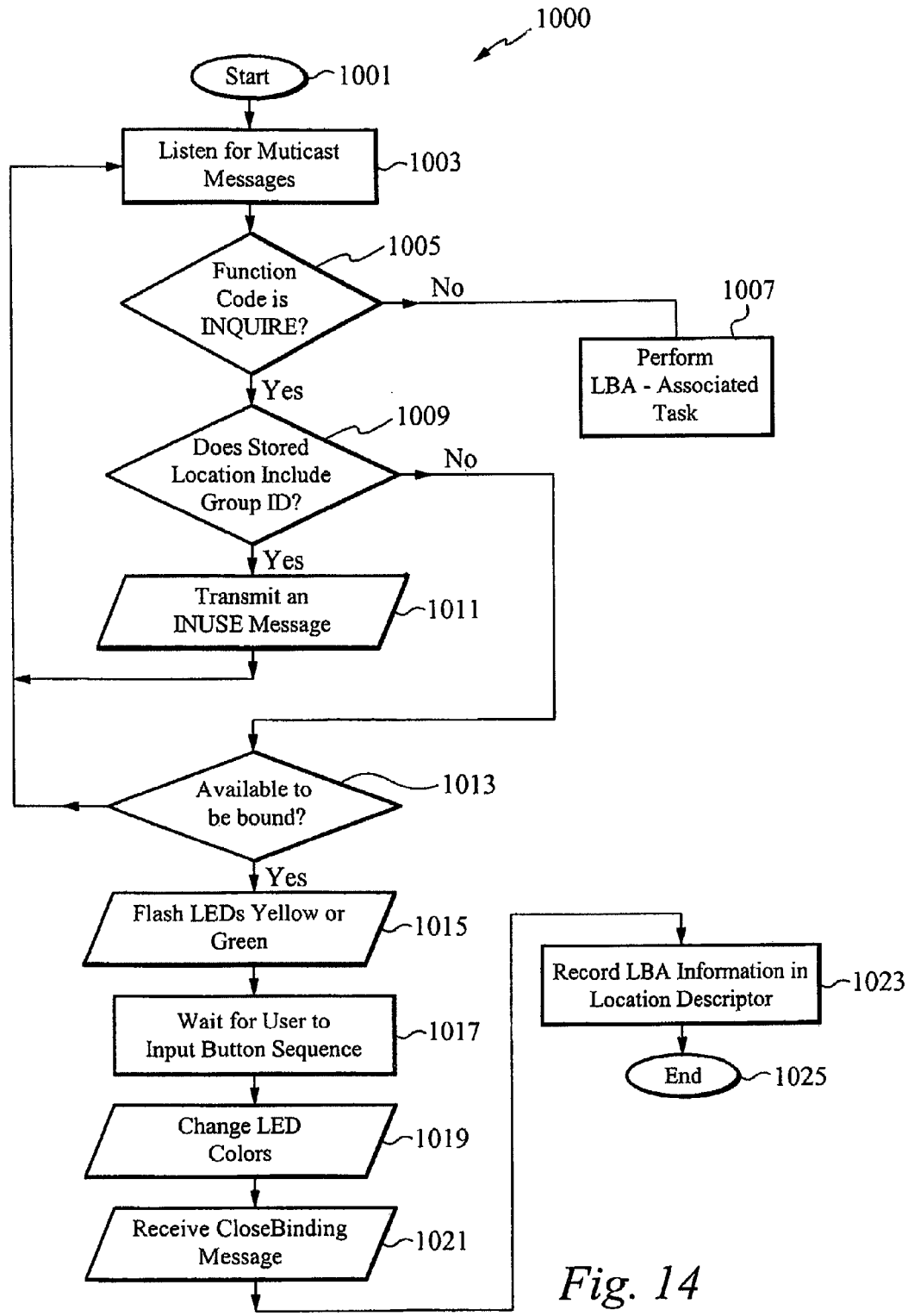
FIG. 14 is a flow chart for the steps performed when a second device is commissioned into a set in accordance with the present invention.

As described above, in accordance with the present invention devices are commissioned into one or more sets of devices by assigning them one or more LDs that can be dynamically created and maintained. FIG. 13 illustrates the steps 900 of a first process performed by a first device and used to commission one or more other devices into a set. This can occur, for example, when a new set is created and devices are put into the set. FIG. 14 illustrates the corresponding steps 1000 of a second process performed by a second device that is queried to join the set.

Referring to FIG. 13, the first process begins in the START step 901. The START step 901 is entered, for example, when a user presses a button or a sequence of buttons on the first device. Next, in the step 903, the first process generates a prospective set identifier for the new set. In one embodiment, the prospective set identifier is generated by a random number generator or a pseudorandom number generator. It will be appreciated that the prospective identifier can be generated by other means such as a timestamp generator or by other data such as the current process ID. Next, in the step 905, the first process formats and transmits a multicast message comprising (1) the function code INQUIRE, (2) the location descriptor of the first device, and (3) the prospective set identifier. Next, in the step 907, the first process listens for return (response) messages from devices within a selected area. In a preferred embodiment, the selected area includes a house having rooms to be configured in accordance with the present invention.

Next, in the step 909, the first process waits a pre-determined time to receive any INUSE messages. Another device will transmit an INUSE message to the first device if the other device possesses (e.g. is bound to) a location that includes the prospective set identifier. In that case, the prospective set identifier cannot be used, and the first process loops back to the step 903 to generate another prospective set identifier.

If the first device does not receive an INUSE message within the pre-determined time, it continues to the step 911. In the step 911, the first process begins advertising the prospective set identifier, by repeatedly transmitting an OpenBinding message. In this embodiment, an OpenBinding message is any message that notifies a device within the selected area that a new set has been formed and a device can now join it. As described below in relation to the step 1015 in FIG. 14, in a preferred embodiment, when a device that is available to join the set receives the OpenBinding message, it flashes its LEDs. In one embodiment, a device flashes its LEDs yellow if it is already a member of the set and green if it is not. If a device is not available to join a set, either because it is in a different house or building, it will not flash its LEDs.

Next, in the step 913, after a second device has been configured to join the set (see step 1023 in FIG. 14, discussed below), a user selects a button or a sequence of buttons on the first device, thereby triggering the first device to generate and transmit a CloseBinding message. As discussed below, when other devices receive a Closebinding message, they record the previously-advertised LBA information in their location descriptors. The first process then terminates in the END step 915.

It will be appreciated that a device can be a member of more than one set at one time. For example; a device can be located in a room partitioned by a movable wall. When the wall is in one position, the device is contained in a first room. When the wall is moved to a second position, the device is contained in a second room. The device can concurrently be a member of more than one logical set by storing multiple LBA information, indicating that it has (e.g. is concurrently bound to) several LBAs and is thus a member of multiple sets with corresponding to the LDs.

Preferably, the device stores each set of LDs information in its memory. For example, the memory can contain a table having entries, each of which contains a single LD. When the device receives messages addressed to a set with a transmitted LBA, a process executing on the device scans the table. If any entry in the table has an LD that corresponds to the transmitted LBA, the process determines that the device is a member of the set indicated by the transmitted LBA and takes action targeted for each member of the set. In this way, a device can be a member of multiple sets having unique LDs.

FIG. 14 shows the steps 1000 performed by a second process executing on a second device that can potentially join a set responsive to an advertised LBA, such as the LBA advertised in step 905 of FIG. 13. The second process starts in the START step 1001. Next, in the step 1003, the second process listens for multicast messages, such as the multicast message transmitted in the step 905. After the second device receives a multicast message, the second process checks whether the multicast message has the function code INQUIRE. If the function code is not INQUIRE, the second process continues to the step 1007, where it performs some LBA-associated task, such as dimming a light of the second device. If the function code is INQUIRE, the second process continues to the step 1009.

Next, in the step 1009, the second process checks whether the set ID stored in the advertised message (the advertised set ID) matches a set ID stored on the second device. Preferably, one or more set IDs are stored on the second device in a table, like the one described above in reference to FIG. 13. If the advertised set ID matches one of the stored set IDs, the second process continues to the step 1011, where it transmits an INUSE message, and then loops back to the step 1003. If the advertised set ID does not match any stored set IDs, the second process continues to the step 1013.

Next, in the step 1013, the second process determines whether the second device is available to join (e.g. to be bound to) the set. As described above, the second device maybe unable to join a set if it is in a different building or house than that of the first (advertising) device. If the second device is not available to be bound, the second process loops back to the step 1003; otherwise, the second process continues to the step 1015. In the step 1015, the second process causes the LEDs on the second device to flash, yellow if the second device is already bound to the set, green if not.

After the step 1015, the second process continues to the step 1017, where it waits for a user to press a button or a sequence of buttons on the second device, causing the second device to be bound to the set as described below in the step 1023. Next, in the step 1019, the second process causes the LEDs on the second device to change color, thereby indicating that it will be included in the advertised binding.

Next, in the step 1021, after a user has pressed the button or the sequence of buttons on the first device as described in the step 913 in FIG. 13, the second device receives the CloseBinding message in step 1021. Next, in the step 1023, the second device records the LBA information in the location descriptor, thereby binding the second device to the set corresponding to the advertised LBA. The second process then continues to the step 1025, where it ends.

In accordance with the present invention, the devices in a set can be changed by changing their bindings. Thus, a device can be commissioned into a set by binding it to the LBA corresponding to the set, and a device can be removed from a set by forming a set and not commissioning the device into the set.

The LBA information is contained in the control signal's data field or in the data structure that defines the LBA (e.g. FIG. 4, 405, 410, 420). In addition, the transmitting device can include preset instructions in its data fields, which will later be stored in receiving devices.

The preset instructions include but are not limited to (1) a sequence of steps that correspond to a particular function code and are executed when the receiving device receives a control signal having the particular control, (2) instructions that are performed by a receiving device when it is powered on, such as self-test functions, (3) instructions to set default values, or (4) any other sequence of steps that can be performed on a receiving device. It will be appreciated that preset functions can be stored on a receiving device in other ways and at other times, such as by storing the instructions in firmware when the receiving device is being manufactured.

Control signals can be transmitted in many ways in accordance with the present invention. For example, a control signal can be encapsulated into a control packet containing the address of the sending device (the source address) and the address of the receiving device or set of devices (the destination address). In a first embodiment, the source address and the destination address are any one of an LBA, a MAC address, and an IP address. In a second embodiment, the control message is sent without being encapsulated, having a format shown in FIG. 4, with the LBA contained in the first few bytes of the control signal. In this second embodiment, the sending address can optionally be stored in the data field.

In accordance with the present invention, control signals are transmitted as either an anonymous multicast signal, a multicast signal, a broadcast signal, or a unicast signal. FIG. 15 shows Table 1, which lists these signals and the addresses used by each. Table 1 has a first row 1110, a second row 1120, a third row 1130, and a fourth row 1140, with each row containing the destination and source addresses for a particular type of signal. The destination address for the signal in the column 1115 is given in the intersection of the corresponding row and the column 1125. The source address for each type of signal is given in the intersection of the corresponding row and the column 1135. Thus, as shown in Table 1, a broadcast signal (row 1110) does not contain a destination address but does contain a source address, an LBA. An anonymous multicast signal (row 1120) contains a destination address, an LBA, but does not contain a source address. A unicast signal (row 1130) contains a destination address (a MAC address) and a source address (a MAC address). A multicast signal (row 1140) contains a destination address, an LBA, a source address, and a MAC address.

In accordance with a preferred embodiment, control signals are transmitted as anonymous multicast signals. Using anonymous multicast signals advantageously reduces the number of signals that must be transmitted to control receiving devices, thus reducing the bandwidth used by both the transmitting device and receiving devices. In addition, using anonymous multicast signals reduces the complexity of the receiving devices since they do not have to process the source address, format a response (e.g. handshaking or acknowledgment) control signal, and transmit the response control signal, a process. As stated above, this process can be repeated. Also, as stated above, a system in accordance with the present invention can switch between broadcasting different types of signals, depending on the transmission traffic, the time of day, or other criteria.

The other types of signals illustrated in FIG. 15 can be used in various applications. As a first example, in one embodiment, a transmitting device transmits a multicast signal to devices in a set determine to whether the devices have been commissioned to (e.g. are controlled by) another transmitting device. The transmitting device includes an LBA as the destination address and its MAC address as the source address. One or more receiving devices in the room can respond directly to the transmitting device by formatting and transmitting a response control signal. The response control signal will have as its destination address the address of the transmitting device. The response control message can include an LBA, which can signify that another transmitting device has already commissioned the receiving devices in the room. Alternatively, a receiving device can respond with a control signal containing an INUSE function code.

As a second example, a transmitting device can gather diagnostics, maintenance and other information. When the traffic of control signals is low (e.g. during holidays, nights, etc.), a transmitting device can transmit a multicast signal containing a function code corresponding to a query of maintenance or diagnostics data. Because each targeted receiving device receives a control signal containing the transmitting device's MAC address, each targeted receiving device can respond to the transmitting device by transmitting to the transmitting device (e.g. using its address as the destination address) a control signal that contains the receiving device's diagnostics data. The transmitting device can then store, analyze, or otherwise process the diagnostics data for all of the receiving devices in the targeted set. These diagnostic data can then be used for maintenance, security, monitoring, billing, or other purposes.

As a third example, receiving devices in a system can transmit multicast signals when the system is electing a master receiving device from among a pool of receiving devices. During this arbitration process, each receiving device can transmit a multicast signal containing its MAC address as the source address. The system can be configured to select the receiving device with the highest numbered MAC address as the master receiving device for the set. Alternatively, the system can be configured to select the receiving device with the lowest numbered MAC address as the master receiving device for the set. It will be appreciated that the selection process can include other criteria. For example, if a first MAC address identifies a first candidate as a hand-held (e.g. portable) device and a second MAC address identifies a second candidate as a permanent (e.g. fixed) device in the domain, a voting scheme can elect the permanent device as the transmitting device.

In accordance with another embodiment of the present invention, LBA's are used to perform "occupancy emulation." In this embodiment, devices are bound into a set. The states of the devices in the set are recorded over a pre-determined time. Control signals addressed to the set and containing function codes for adjusting the devices to the recorded values are later transmitted to the devices, so that the devices "playback" the environment settings. The environment will then correspond to the device settings when a user was home. Would-be intruders and other passers-by would believe that a home owner was home.

This embodiment can be realized in any number of ways. As one example, a repeater located within the environment to be emulated is configured as a transmitting and receiving device. The repeater receives control signals transmitted and stores them in memory over a pre-determined time period such as one week. The repeater can be configured to store only selected control signals. For example, the repeater is configured to store only commands to lights, none to fans or heaters. Alternatively, the repeater is configured to query specific groups of devices at pre-determined intervals to retrieve and store their settings. Later, before the home owner goes on vacation, she can activate the repeater to play back the commands at the pre-determined time intervals so that the house environment (e.g. light settings) emulate the settings of a previous week when the home owner was home.

Using occupancy emulation in accordance with the present invention, the initial state of an environment (from which the emulation is initiated) can be recalled using a "snapshot" command or function transmitted from the repeater to the receiving devices; invoking the snapshot command rewinds the environment settings to this initial state. The snapshot command contains an index as an operand. The repeater transmits a snapshot command at a pre-selected time interval (e.g. every 90 minutes), with the index indicating the current 90 minute interval. When a controlled (and later, emulated) device receives the control signal with the snapshot command, the receiving device stores its state (e.g. settings). Next, to start occupancy emulation, the repeater transmits a control signal containing an index to each device in the environment and instructing each to adjust its settings to that corresponding to the index.

In accordance with embodiments of the invention, LBAs are used to record presets of environments. As used herein, a "preset" or "scene" is a recalled state of an environment over time. For example, a set of devices are bound to a preset LBA. When all the devices in a room have one common LBA, it is advantageous that not all devices are controlled using that common LBA. For example, using a common control signal to put adjust the lights to a maximum value would also adjust the fans in the room to their maximum value. In this embodiment, only the fans are bound to a preset LBA so that only they participate in the preset. When commissioning these devices into the preset LBA, first the devices to participate in the preset LBA are selected, next, the preset is recorded in the transmitting device, then the devices are bound to the preset LBA as, for example, described above in relation to FIGS. 13 and 14. It will be appreciated that a •device can have any number of presets, depending on the application at hand.

In one embodiment, the preset state is reached over a pre-determined time period, thus allowing a device to gradually "ramp up" to its final state. Thus, when recording the preset state, the preset value and optionally the time over which it reaches this preset value are recorded. In yet another embodiment, the preset value can be overridden and later reverted to. Thus, for example, a device such as a light has a first preset state. When unauthorized entry into a room is detected, the preset state is overridden and the light is put into a "burglar state" in which it flashes. When the flashing light is no longer needed, the light reverts from the burglar state to the preset state.

The present invention has been described in terms of specific embodiments incorporating details to facilitate the understanding of the principles of construction and operation of the invention. As such, references herein to specific embodiments and details thereof are not intended to limit the scope of the claims appended hereto. For example, a transmitting device can be used to transmit control signals using LBAs from a remote location rather than from within a room, thus remotely controlling devices based on LBAs. Also, a receiving device, such as that shown in FIG. 11, can have a receiver but not a transmitter, and can be configured to receive but not transmit control signals. It will be apparent to those skilled in the art that modifications can be made to the embodiments chosen for illustration without departing from the spirit and scope of the invention.

We claim:

1. A system for controlling a plurality of devices using a location-based address, the system comprising:
    a) a first device configured to transmit anonymous control signals containing location-based addresses and function codes;
    wherein the first device is selected from the group consisting of a light fixture, a fan, an electrical heater, a motion detector or an air conditioning and heating unit, and the location based addresses are embedded within data fields that code for unchanging spacial locations within a floor plan of a building; and
    wherein the first device includes a microprocessor programmed with one or more first device location descriptors corresponding to at least one of the unchanging spacial locations within the building and wherein the first device is configured to automatically execute a function in response to control signals comprising location based addresses that match one or more first device location descriptors corresponding to the at least one of the unchanging spacial locations within the building;

b) a second device configured to receive the control signals, wherein the second device is selected from the group consisting of a light fixture, a fan, an electrical heater, a motion detector or an air conditioning and heating unit and wherein the second device includes a micro-processor programmed with a second device location descriptor corresponding to at least one of the unchanging spacial locations within the building, the second device being configured to automatically execute functions corresponding to the function codes in response to a match between the location-based addresses and the second device location descriptor corresponding to the at least one of the unchanging spacial locations within the building.

2. The system of claim 1 wherein the second device is configured to generate and transmit a sister set of control signals that correspond to a previously transmitted sequence of control signals.

\* \* \* \* \*